(12) United States Patent
Ramotowski

(10) Patent No.: US 8,470,921 B2
(45) Date of Patent: Jun. 25, 2013

(54) ULTRA-LOW PERMEABILITY POLYMERIC ENCAPSULATED ACOUSTIC DEVICE AND METHOD

(75) Inventor: Thomas S. Ramotowski, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 455 days.

(21) Appl. No.: 12/758,979

(22) Filed: Apr. 13, 2010

(65) Prior Publication Data

US 2011/0027518 A1 Feb. 3, 2011

Related U.S. Application Data

(63) Continuation-in-part of application No. 11/434,583, filed on May 10, 2006, now abandoned.

(51) Int. Cl.
| | |
|---|---|
| C04B 35/00 | (2006.01) |
| C04B 35/495 | (2006.01) |
| C08G 18/00 | (2006.01) |
| C08G 18/08 | (2006.01) |
| C08G 18/28 | (2006.01) |
| C08K 3/34 | (2006.01) |
| C08K 9/04 | (2006.01) |
| C08L 75/00 | (2006.01) |
| C09C 1/42 | (2006.01) |
| E04B 1/82 | (2006.01) |
| E04B 1/84 | (2006.01) |
| E04B 2/02 | (2006.01) |
| F21V 7/04 | (2006.01) |
| G01M 1/14 | (2006.01) |
| G01N 29/00 | (2006.01) |
| G01V 13/00 | (2006.01) |
| G02B 6/00 | (2006.01) |
| G02B 7/02 | (2006.01) |
| G09F 13/00 | (2006.01) |
| G05D 25/00 | (2006.01) |
| G10K 11/16 | (2006.01) |
| H01L 29/12 | (2006.01) |
| H01L 29/40 | (2006.01) |
| H01L 29/84 | (2006.01) |
| H01L 41/18 | (2006.01) |
| H01L 41/187 | (2006.01) |

(52) U.S. Cl.
USPC ............ 524/445; 73/1.82; 181/290; 181/294; 181/296; 252/62.3 R; 252/62.3 Q; 252/62.9 R; 257/245; 257/254; 257/416; 362/551; 362/582; 524/447; 524/589; 524/590; 528/44

(58) Field of Classification Search
USPC 524/445, 447, 589, 590; 528/44; 252/62.3 R, 252/62.3 Q, 62.9 R; 73/1.82; 257/245, 254, 257/416; 181/290, 294, 296; 362/551, 582
See application file for complete search history.

(56) References Cited

U.S. PATENT DOCUMENTS

| | | | | |
|---|---|---|---|---|
| 3,788,937 A | * | 1/1974 | Lee | ................................ 181/290 |
| 5,951,908 A | * | 9/1999 | Cui et al. | ................. 252/62.9 R |
| 5,952,093 A | | 9/1999 | Nichols | |

* cited by examiner

*Primary Examiner* — Patrick Niland
(74) *Attorney, Agent, or Firm* — James M. Kasischke; Michael P. Stanley; Jean-Paul A. Nasser

(57) ABSTRACT

This invention is an acoustic device protected by an acoustically transparent low water permeability encapsulant made from an acoustically clear polymer such as polyurethane. High aspect ratio clay nanoparticles are positioned in the substrate in overlapping layers with layers of the substrate interposed. The invention also provides a method for forming an acoustically transparent low permeability encapsulant about an acoustic device. The method includes treating high aspect ration clay nanoparticles to make them organophilic. The treated nanoparticles are then mixed in a polymer resin in such a way as to form an intercalated mixture. A curing agent is added to the mixture, and the mixture is allowed to set. When set the resulting intercalated mixture produces an acoustically clear, low permeability polymer coating.

11 Claims, 2 Drawing Sheets

ULTRA-LOW PERMEABILITY POLYMERIC ENCAPSULATED ACOUSTIC DEVICE AND METHOD

RELATED U.S. APPLICATION DATA

This application is a Continuation-in-Part of U.S. patent application Ser. No. 11/434,583, filed 10 May 2006 now abandoned.

STATEMENT OF GOVERNMENT INTEREST

The invention described herein may be manufactured and used by or for the Government of the United State of America for governmental purpose without payment of any royalties thereon or therefore.

BACKGROUND OF THE INVENTION

Most of the materials presently used to coat naval platforms and to encapsulate acoustic sensors have been around for decades. The performance of these materials from a variety of perspectives is truthfully characterized as "barely adequate." Because of these limitations, design engineers have had to accept many compromises concerning cost and/or service lifetime. These compromises now threaten the viability of some of the U.S. Navy's most cherished future hardware concepts, such as miniaturized, distributed sensors, large area sensors smart skins, and hi-powered acoustic sources. They are also inconsistent with the Navy's current "total ownership cost reduction" thrusts in the areas of service lifetime extension and reduced maintenance requirements. Using existing materials alone many of these advanced concepts and reliability improvements simply cannot be realized. The existing materials are used because of their ease of application and because other concerns and material requirements (primarily acoustical) are viewed as more important than their barrier properties.

The encapsulants used in acoustic applications must be acoustically clear. The term "acoustically clear" means that acoustic energy is able to enter and transit through the material with a minimal amount of reflection, loss, distortion or absorption. Only a small set of polymers have been found to possess the physical properties and chemical structures that ensure acoustic clarity. Of these materials, those that are castable, such as polyurethane, tend to exhibit greater water permeability than those that are vulcanizates, such as butyl rubber, EPDM (ethylene propylene diene monomer) rubber, and polychloroprene rubber.

Castable materials are preferred because they can be poured into molds and cured at room temperature or at moderate temperatures in an oven. Commonly used acoustic devices include sensors and sources. These devices are made from materials such as piezoelectric crystals and polymers, are temperature sensitive, and cannot be subjected to high temperatures and pressures. The vulcanizates require higher temperatures and pressures to cure. Thus they are typically made in the form of a boot or covering that is then adhesively bonded or mechanically clamped to the acoustic device. Modification of castable, acoustically clear materials to make them less permeable to water is highly desirable. Any such modifications would have to preserve the superior acoustic properties of such materials while at the same time, greatly enhancing their barrier properties.

Nanomaterials and polymer nanocomposite technology might be able to enhance current encapsulants. As its name implies, a nanocomposite contains particles with at least one nanoscale ($10^{-9}$ meter) aspect (length, width or thickness). Because of the enormous surface area a dispersion of such particulates possesses, relatively small loadings (typically a few weight percent) in a suitable polymer matrix may exhibit orders of magnitude-scale improvements in certain physical properties and/or influence the structure of the polymer matrix in ways not possible to achieve with conventional technology. Careful selection of the chemistry and geometry of the nanoparticles frequently allows the bulk properties of the resulting polymer nanocomposite to be close to those of the unfilled polymer matrix: while greatly enhancing a specifically targeted physical property of interest. Such "input/output" selectivity promises to deliver significantly improved coatings and encapsulants for naval applications including coatings with orders of magnitude lower water/gas permeability and encapsulants with ten times the normal polymer thermal conductivity.

The barrier-property-enhancing fillers are nanoscale (ca. 3-10 nanometers thick by several hundred to several thousand nanometers across) plates derived from a variety of different phyllosilicate clay minerals, such as montmorillonite, hectorite, saponite, bentonite and the like. These materials are known as "sheet silicates" because they are made up of tiny particles which are themselves composed of a large number of extremely thin mineral sheets (like mica). Thousands of these individual sheets stacked on top of each other form an individual clay mineral particle. The sheets are only loosely held together in the vertical direction by Van der Waals forces. Thus, the particles are permeable in the X-Y direction (between sheets), but they are essentially impermeable in the Z direction (through the sheets). Clay minerals are preferred as starting materials because they are composed of nano-to-micron scale particles that can be converted (with the proper chemical pre-treatment) into large numbers of individual sheets/plates with large aspect ratios (typically 100:1 or greater).

These fillers are not typically used in acoustic applications because they are not acoustically transparent. The speed of sound, c, in the composite is approximately equal to:

$$c = \sqrt{\frac{M}{\rho}} \quad (1)$$

where:
M=modulus of elasticity; and
ρ=density.

For acoustic clarity, the product of sound speed, c, and density, ρ, of the coating/encapsulant must be close to the ρc product of the surrounding medium, seawater. Unfilled polyurethane has a ρc product approximately equal to that of seawater. Adding a filler of higher density, like clay, causes the ρc product of the resulting composite to deviate from the ρc product of seawater. The more filler, the higher the density. Also, as filler is added, the modulus increases, and thus, so does the sound speed, c. In conventional composites it is common to add 20-30% by weight of filler. This makes the composite material no longer acoustically transparent. Thus, the use of fillers in polyurethane has always presented a problem.

There are three possible particle-matrix in clay particulate-based polymer nanocomposites shown in FIGS. 1A, 1B and 1C. First, in FIG. 1A, the composite 10A is shown with the clay particles 12 dispersed within the polymer matrix 14 in their natural state. This geometry does not lead to especially interesting or useful properties because the clay particles 12 are porous and do not present an obstacle to liquid travel. FIG. 1B shows the "exfoliated" or "delaminated" geometry as 10B. In this geometry, the individual sheets 16 comprising each clay particle are separated from each other and dispersed individually within the polymer matrix 14. Sheets 16 are disposed randomly in the matrix. Because the individual sheets 16 are not overlapped, they do not present significant barriers to fluid travel. The third polymer-particulate geometry is shown in FIG. 1C. The geometry of sample 10C is referred to as "intercalated." In this arrangement, a single layer of polymer chains 18 is infiltrated between the individual sheets/layers 20 that comprise a clay particle. A polymer matrix 14 is formed outside of the intercalated particles. This geometry leads to alternating, thin layers of silicate and polymer a few nanometers apart.

Both the exfoliated and the intercalated geometries lead to improvements in the barrier properties (including a significant decrease in water permeability) of the resulting nanocomposite; however, the intercalated geometry leads to significantly better properties. The primary difference between creation of the geometries is the time and extent of mixing or sonicating. As mixing increases, the clay particles become delaminated and are more likely to form the exfoliated geometry.

For applications in which water permeation is a critical concern, hydrophobic, non-polar polymers such as EPDM and butyl rubber are typically used. These materials are vulcanizates which are crosslinked through the use of heat in pressurized molds. These materials must be molded first, and then bonded to the sensor. Their non-polar nature makes it difficult to bond anything else strongly to them. Thus, most EPDM and butyl rubber boots are secured to the underlying sensor (where possible) by metal bands or other mechanical means. What marine sensor designers would really like to have is an acoustically "clear" encapsulants that will cure in place where it is poured, and which, when cured, will exhibit very low water permeability constants similar to (or better than) those of EPDM and butyl rubber. At the present time, no such materials exist.

SUMMARY OF THE INVENTION

Accordingly, this invention is an acoustically transparent low water permeability encapsulant made from an acoustically clear polymer such as polyurethane. High aspect ratio clay nanoparticles are positioned in the substrate in overlapping layers with layers of the substrate interposed. The invention also provides a method for forming an acoustically transparent castable low permeability encapsulant. The method includes treating high aspect ratio clay nanoparticles to make them organophilic. The treated nanoparticles are then mixed in a polymer resin. A curing agent is added to the mixture, and the mixture is allowed to set.

These and other features, aspects and advantages of the present invention will become better understood with reference to the following drawings, description and claims.

DETAILED DESCRIPTION OF THE INVENTION

Figure 1A:
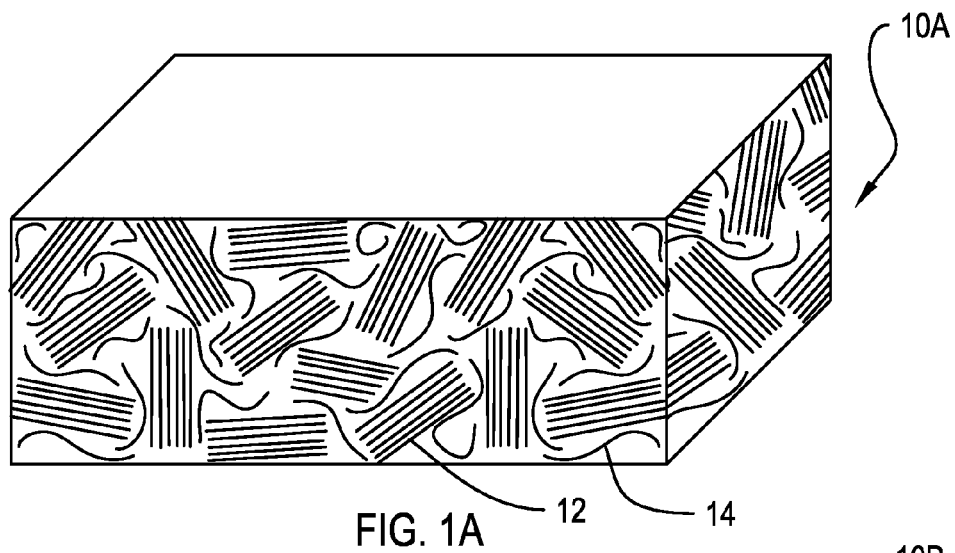
FIG. 1A illustrates a conventional mix of clay nanoparticles in a polymer matrix.
Figure 1B:
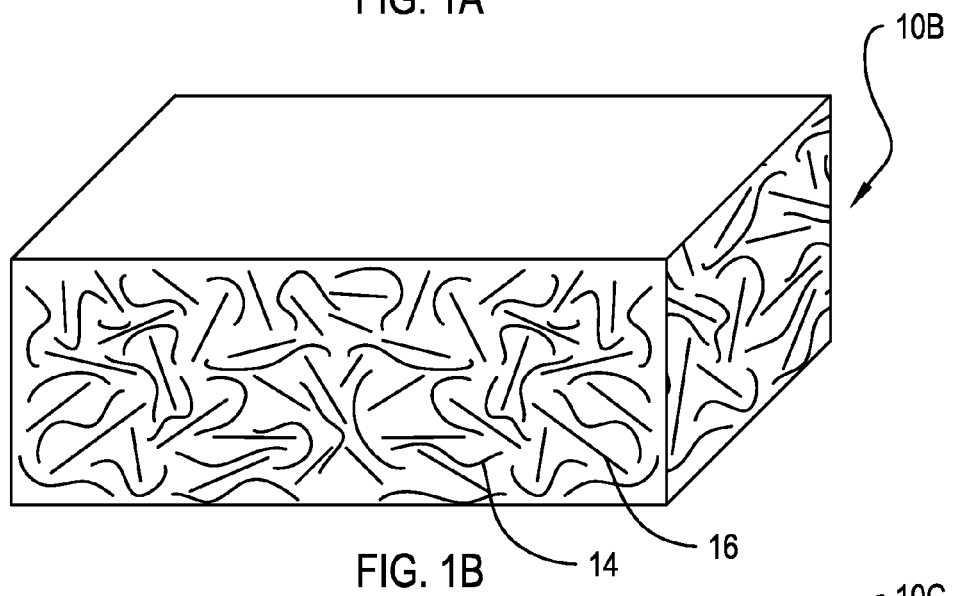
FIG. 1B illustrates a delaminated mix of clay nanoparticles in a polymer matrix.
Figure 1C:
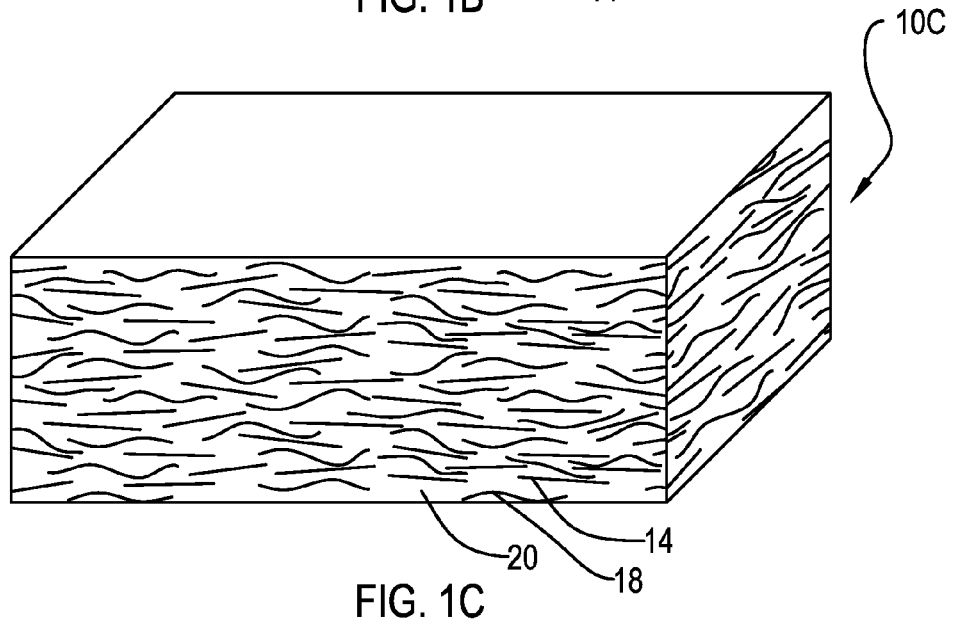
FIG. 1C illustrates an intercalated mix of clay nanoparticles and polymer in a polymer matrix.

The present invention utilizes chemically modified clay nanoparticles to significantly lower water permeation through acoustically clear polyurethane. The use of nanoparticle clay fillers allows avoidance of filler/acoustic clarity problems. This is because the amount of filler needed to achieve a large decrease in permeability is low, ca. 2-8%. This minimizes the change in density, $\rho$, and sound speed, c.

In order to form an intercalated nanocomposite, the appropriate particles must be selected. The particles should be stacks of particles having a mean diameter at least 100 times the mean thickness. In other words, preferably, the aspect ratio should be greater than 100. An intercalated dispersion of the particles must be achieved. The polymer can then be allowed to polymerize between the plate-like particles to form a nanocomposite that functions as a permeation barrier similar to a tile roof on a building. The intercalated geometry is essential for proper functioning of the nanocomposite. If the particulates are too thoroughly dispersed or poorly dispersed, the scientific literature indicates that the desired decrease in permeability will not be realized.

A considerable advantage of nanocomposites over traditional composites is that the large improvements in physical properties are achieved with relatively low filler loading levels. In some applications filler content is not a concern, but for acoustics, it is very important. As inorganic fillers such as clay particles are added to a polymer; two critical variables, density and sound speed, will increase, and the composite's acoustic clarity will degrade as a result. Because of this, nanocomposites are intriguing for use as sensor encapsulants not only because of the great decrease in water permeability that may be realized, but also because these physical property enhancements occur at low filler levels (about 5% by weight). Thus, for the first time, it should be possible to make ultra-low permeability and acoustically clear composites.

In order to make these kinds of nanocomposites, it is necessary to chemically modify the clay particulates. For charge balance, clay minerals typically contain cations such as $Na^+$, $Li^+$ and $Ca^{2+}$ between the individual sheets. Chemical pretreatment is necessary to convert these normally hydrophilic silicate surfaces into organophilic surfaces that are compatible with polymers. Suitable pretreatments include ion-exchange reactions with organic cations (typically alkylammonium ions), or alteration with silanes.

The weight percentage of particles to polymer must be sufficient to provide barrier protection, but not so much as to interfere with the mechanical properties of the polymer. An ideal range of particle to polymer weight percentages is expected to be around 2-8%. At this weight percentage the resulting material has essentially the same acoustic characteristics as the polymer without the particles. (The addition of these particles may reduce permeability by a factor of 100.) Above this range, the material properties, including the acoustic properties decline. About 10% would be the maximum amount of particles for use in acoustic applications. Below 2%, the particles offer an insufficient barrier to permeating gasses or fluids.

The polymer resin is preferably a polyurethane resin having good acoustic properties. It has been found that the commercially available polyurethane resin Uralite FH-3140 manufactured by H. B. Fuller has acceptable acoustic properties. This resin is used with the standard diamine curing agent. Other polyurethane resins and curing agents having "acoustically clear" properties are expected to be acceptable, as well.

Once the clay particulates have been chemically pretreated, they are mixed into the polymer resin. The polymer resin infiltrates between the individual layers. A curing agent is added to the polymer resin mixture, and it polymerizes in situ. If the proper density of sheets/plates is achieved, the individual sheets will overlap each other, and the layers will function in a manner akin to shingles or tiles on a building roof.

Solution and melt intercalation methods can also be used to form the intercalated polymer. In the solution method the treated nanoparticles are placed in a polar organic solvent having the polymer dissolved therein. The solvent is allowed to evaporate leaving the polymer disposed between layers of the nanoparticles leaving a polymer composite having intercalated nanoparticles. In the melt intercalation method, treated nanoparticles are mixed into a molten thermoplastic. The molten thermoplastic is poured into place and allowed to cool resulting in a solid composite having intercalated nanoparticles.

Permeating molecules cannot pass through the sheets, and will need to spend a considerable amount of time moving around each sheet to reach the next polymer-sheet layer, etc. Thus, permeation though such a coating is greatly retarded, and might be so slow that it could be considered to be negligible during the planned lifetime of the underlying sensor. The development of specially-modified clay nanoparticulates/polyurethane composites with good acoustic characteristics is critical for the manufacture of miniaturized distributed sensors. Fick's first law is an important component of permeation theory:

$$J = -D\frac{\partial c}{\partial z} \qquad (2)$$

In this equation, "J" is the flux of the permeating material; "D" is the diffusion coefficient; "c" is the concentration of the permeable material; and "z" is the thickness of the barrier coating. The flux of the permeating material, J, can also be expressed as a function of permeability:

$$J = \frac{DS(p_h - p_l)}{z} \qquad (3)$$

In this equation, S is the sorption coefficient, $p_h$ is the partial pressure of the diffusing species at the leading edge; $p_l$ is the partial pressure of the diffusing species at the trailing edge: and "DS" is the permeability coefficient. The above expressions for flux indicate that J and z are inversely related. Thus, if everything else remains the same, a reduction in z will result in an increase in the flux of permeating water, thereby shortening the useful working life of the coated device if conventional encapsulants are used. The introduction of clay nanoparticulates into a polymer reduces the flux of permeating water by lowering the diffusion constant, D.

The addition of the modified clay nanoparticles has been shown to reduce permeability (DS) by at least an order of magnitude and possibly by several orders of magnitude in some polymers. If permeability were to be reduced by a factor of 100 by this method, then the thickness of the nanocomposite encapsulant layer could be reduced by the same factor while maintaining the same level of protection for the underlying sensor. If the thickness of the nanocomposite encapsulant layer were reduced only by a factor of 10, then the level of protection for the underlying sensor would be ten times greater than what is possible with existing, unmodified encapsulants, and one would expect the sensor to function in the marine environment ten times longer than normal.

A reduction in encapsulant thickness without a corresponding loss of protection is desirable by itself, because polymeric coatings, by their very nature, increase the volume and mass of the sensor, and also exhibit non-zero acoustic attenuation values. The thicker the encapsulant layer, the greater the amount of acoustic attenuation. Attenuation disperses acoustic energy throughout the polymer as heat, and it can hamper or even prevent the detection of very weak, low-energy signals. Thus, sensor designers would prefer to use the thinnest possible encapsulant layer that will still protect the underlying electronics for the desired period of time. The development of polymer-clay nanocomposites should enable a considerable reduction in encapsulant thickness (and a corresponding increase in acoustic sensitivity) without any decrease in performance or service life.

Significant improvements in barrier coatings would yield additional benefits to naval hardware. Many marine components that include metal to polymer bonds fail because of a process known as "cathodic delamination." During cathodic delamination water and dissolved oxygen permeate through a protective polymeric coating (encapsulant, paint, etc.) and reach an underlying, cathodically polarized metal surface. At the polymer-metal interface, a reaction occurs that generates hydroxide ions from the water and oxygen and free electrons in the metal. An osmotic potential is set up between the bond-line region and seawater that results in the formation of pressurized water blisters that debond the polymer from the metal surface. In some cases, the hydroxide ions might also directly attack the metal-polymer bond. Coatings with greatly improved barrier properties could prevent, or at least significantly slow down, the cathodic delamination process, thereby extending the usable service lifetimes of many pieces of naval hardware. The potential savings in maintenance and replacement costs are considerable.

Figure 2:
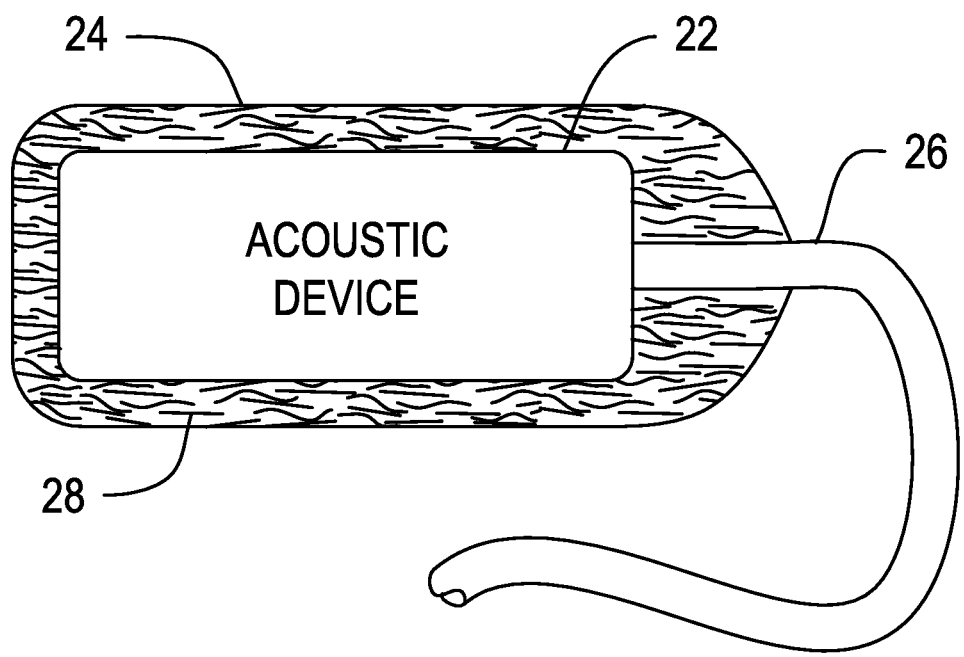
FIG. 2 is a cross-sectional view of an encapsulated acoustic device.

In FIG. 2, there is shown a device 22 having a low permeability encapsulant 24 formed thereabout. The device 22 can be any kind of acoustic device known in the art. These devices include transducers, accelerometers, piezoelectric crystals, piezoelectric composites, fiber optic devices and the like. A communications path 26 extends from the device 22. The encapsulant 24 is cast around the device 22 and communication path 26 according to well known methods. Nanoparticles 28 are shown in the encapsulant 24. This drawing is not to scale. With the methods taught herein, the encapsulant 24 can be thinner than previously known encapsulants while having the same or lower water permeability.

It should be understood, of course, that the foregoing relates to preferred embodiments of the invention and that modifications may be made without departing from the spirit and scope of the invention as set forth in the following claims.

What is claimed is:

1. An encapsulated device comprising:
   an acoustic device;
   a castable polymer substrate having a density, speed of sound product approximating that of the density and speed of sound product for seawater, said polymer being positioned about said acoustic device; and
   clay particles having a planar shape with an aspect ratio of at least 100 intercalated in said substrate at a weight percentage of about 2% to 10% of the weight of said substrate.

2. The device of claim 1 wherein said substrate is polyurethane.

3. The device of claim 1 wherein said clay particles have a thickness of less than 20 nanometers and a mean diameter of at least 100 nanometers.

4. The device of claim 1 wherein said clay particles are made from a phyllosilicate material.

5. The device of claim 4 wherein said clay particles are chemically modified to make the particles organophilic.

6. The device of claim 5 wherein said clay particles are chemically modified by an ion exchange reaction with at least one of an organic cation, alkylammonium ions and silane ions.

7. A method for making an encapsulated acoustic device comprising the steps of:
   providing a polymer resin said resin after setting having a density, speed of sound product approximating that of the density and speed of sound product for seawater;
   providing planar, high aspect ratio clay particles having an aspect ratio of at least 100;
   treating said high aspect ratio clay particles to make the clay particles organophilic;
   mixing said treated clay particles with said polymer resin and a curing agent in such a way as to form an intercalated particle-resin mixture with a weight percentage of about 2% to 10% of clay particles to polymer resin;
   providing an acoustic device in a mold;
   putting said intercalated particle-resin mixture in said mold about said acoustic device; and
   allowing said particle-resin mixture to set thereby producing the encapsulated acoustic device.

8. The method of claim 7 wherein said step of treating comprises an ion exchange reaction with an organic cation.

9. The method of claim 8 wherein the organic cation is alkylammonium.

10. The method of claim 7 wherein said clay particles are selected from the group of phyllosilicate minerals.

11. The method of claim 10 wherein said clay particles have a thickness of less than 20 nanometers and a mean diameter of at least 100 nanometers.

\* \* \* \* \*